(No Model.)
S. W. HYATT.
LEVER MECHANISM.
No. 600,125. Patented Mar. 1, 1898.
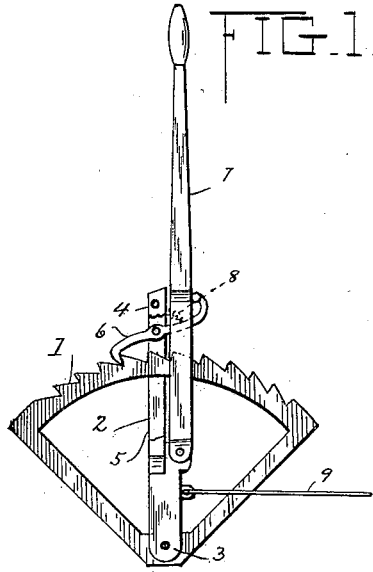
FIG. 1.
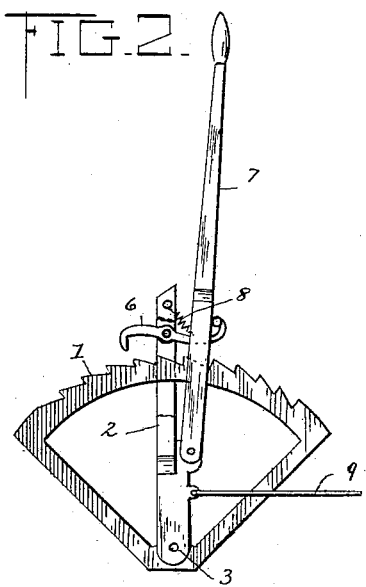
FIG. 2.
FIG. 3.
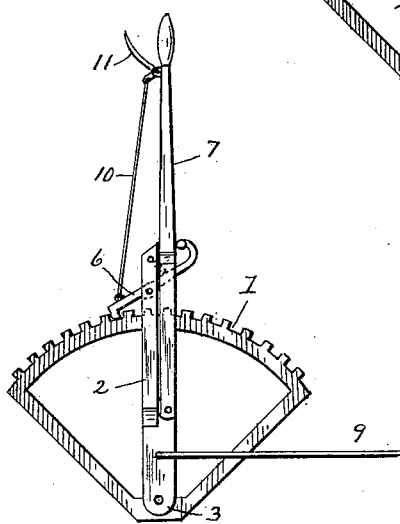
FIG. 4.
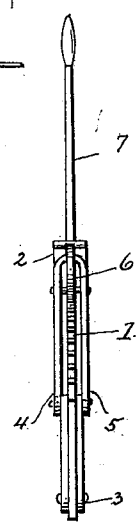
FIG. 5.
WITNESSES
Sam'l R. Turner
A. M. Poynton
INVENTOR
Samuel W. Hyatt.
By John Wedderburn
Attorney

UNITED STATES PATENT OFFICE.

SAMUEL W. HYATT, OF GREERSVILLE, OHIO, ASSIGNOR OF ONE-HALF TO JOHN W. MONINGER, OF SAME PLACE.

LEVER MECHANISM.

SPECIFICATION forming part of Letters Patent No. 600,125, dated March 1, 1898.

Application filed February 16, 1897. Serial No. 623,683. (No model.)

*To all whom it may concern:*

Be it known that I, SAMUEL W. HYATT, a citizen of the United States, residing at Greersville, in the county of Knox and State of Ohio, have invented certain new and useful Improvements in Lever Mechanisms; and I do hereby declare the following to be a full, clear, and exact description of the invention, such as will enable others skilled in the art to which it appertains to make and use the same.

My invention relates to improvements in lever mechanisms; and the object of the same is to provide a very simple and easy-working lever mechanism for use with either tilting or stationary machinery, the device being very effective in its operation.

The invention consists in the novel details of construction hereinafter fully described and claimed, and illustrated in the accompanying drawings, in which—

Figure 1 is a side elevation of my invention, partly in section, the same being shown locked to the toothed segment. Fig. 2 is a similar view of the invention, the same being shown disengaged from the segment. Fig. 3 is a side elevation showing the device adapted for use with tilting machinery, the lever being shown locked to the toothed segment. Fig. 4 is a similar view showing the lever released from the segment. Fig. 5 is an end elevation of Fig. 1.

Referring to Fig. 1, 1 indicates a toothed segment having pivoted thereto the pawl or ratchet carrying lever 2. This lever, as stated, is pivoted at its lower end 3 to the segment and is bifurcated at its upper end, the arms 4 and 5, formed by the bifurcations, extending on either side of the segment. Pivoted between these arms is the dog 6, which engages the teeth of the segment. The lower end of this dog is extended through the recessed operating-lever 7, which is pivoted to the flat portion of lever 2, as illustrated. The extended end of the dog is curved and is held pressed normally upward and against the outer face of lever 7 by means of the spring 8, attached at one end to the dog and at its opposite end to the upper end of lever 2. The cord or rod 9 connects the lever 2 with the brake-shoe or machinery to be operated.

When it is desired to release the dog from engagement with the teeth of the segment, the operating-lever is pulled backward, bearing against the extended end of the dog and raising its forward end, as illustrated in Fig. 2. The lever may then be pushed forward, it bearing against the lever 2 and sliding the dog from tooth to tooth until the required adjustment is reached.

In Fig. 3 I have illustrated my invention as applied to tilting machinery, in which it will be noticed that the rod 10 is attached to the dog and is connected at its upper end with an operating-lever 11, pivoted to the main operating-lever. This is provided for the purpose of holding the dog raised while moving the operating-lever forward, the teeth in the toothed segment being square in this instance, whereby the dog cannot slide thereon in moving backward, as in Fig. 1. This latter construction is adapted for tilting machinery.

From the above description it will be observed that I have produced a very simple and effective lever mechanism for machinery of all kinds, including tilting or otherwise, or for operating a brake-shoe.

Having thus described my invention, what I claim as new, and desire to secure by Letters Patent, is—

The combination with a segment, of a lever pivoted at its inner end and carrying a dog at its outer end which engages the teeth of the segment, and an operating-lever pivoted to the first-named lever at a point intermediate the pivotal point of the latter and the dog carried thereby, said operating-lever engaging and operating the dog, substantially as described.

In testimony whereof I have signed this specification in the presence of two subscribing witnesses.

SAMUEL W. HYATT.

Witnesses:
JOHN W. MONINGER,
BYRON L. RICE.